(12) United States Patent
Beausoleil et al.

(10) Patent No.: US 7,002,133 B2
(45) Date of Patent: *Feb. 21, 2006

(54) DETECTING ONE OR MORE PHOTONS FROM THEIR INTERACTIONS WITH PROBE PHOTONS IN A MATTER SYSTEM

(75) Inventors: Raymond G. Beausoleil, Redmond, WA (US); William J. Munro, Bristol (GB); Timothy P. Spiller, Bristol (GB); Kae Nemoto, Tokyo (JP); Sean D. Barrett, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/678,437

(22) Filed: Oct. 3, 2003

(65) Prior Publication Data

US 2004/0200950 A1   Oct. 14, 2004

Related U.S. Application Data

(63) Continuation-in-part of application No. 10/412,019, filed on Apr. 11, 2003.

(51) Int. Cl.
*H01L 31/00* (2006.01)

(52) U.S. Cl. .............................. 250/214.1; 250/214 R

(58) Field of Classification Search ............ 250/214.1, 250/216, 214 R, 336.1
See application file for complete search history.

(56) References Cited

U.S. PATENT DOCUMENTS 5,740,117 A      4/1998   Bona et al.
6,741,374 B1 *   5/2004   Pittman et al. ............. 359/108

OTHER PUBLICATIONS

Chiao, Raymond Y. and Milonni, Peter W., "Fast Light, Slow Light," Optics and Photonics News, pp. 26-30 (Jun. 2002).
D'Ariano, G.M. et al., "State Preparation By Photon Filtering," arXiv:quant-ph/9906077v1, pp. 1-9 (Jun. 21, 1999).
Juzeliunas, G. et al., "Storing and Releasing Light in a Gas of Moving Atoms," arXiv:quant-ph/0210123v1, pp. 1-4 (Oct. 16, 2002).
Leonhardt, Ulf, "A Primer to Slow Light," arXiv:gr-qc/0108085v2, pp. 1-20 (Jan. 9, 2002).
Lloyd, Seth et al., "Quantum Computation Over Continuous Variables," Physical Review Letters, vol. 82, No. 8, pp. 1784-1787 (Feb. 22, 1999).
Pittman, T.B. and Franson, J.D., "Cyclical Quantum Memory for Photonic Qubits," pp. 1-4 (Jul. 8, 2002).

(Continued)

*Primary Examiner*—Que T. Le

(57) ABSTRACT

A device capable of efficiently detecting a single-photon signal includes a matter system, sources of a first beam and a second beam, and a measurement system. The matter system has a first energy level and a second energy level such that a signal photon couples to a transition between the first energy level and the second energy level. The first beam contains photons that couple to a transition between the second energy level and a third energy level of the matter system, and the second beam contains photons that couple to a transition between the third energy level and a fourth energy level of the matter system. The measurement system measures a change in the first or second beam to detect the absence, the presence, or the number of the photons in the signal.

22 Claims, 5 Drawing Sheets

OTHER PUBLICATIONS

Rostovtsev, Yuri et al., "Slow, Ultraslow, Stored, and Frozen Light," Optics and Photonics News, pp. 44-48 (Jun. 2002).

Wang, Hai et al., "Enhanced Kerr Nonlinearity via Atomic Coherence in a Three-Level Atomic System," Physical Review Letters vol. 87, No. 7, pp. 073601-1 to 073601-4 (Aug. 13, 2001).

Opatrny T et al-"Coupled Cavities For Enhancing The Cross-Phase-Modulation In Electromagnetically Induced Transparency"-Phys Review vol. 64 No 2 Jul. 9, 2001- pp. 023805/1-9.

Imoto N et al-"Quantum Nondemolition Measurement Of The Photon Number Via The Optical Kerr Effect"-Phys Review vol. 32 No 4 Oct. 1985 pp. 2287-2791.

Schmidt H et al-"Gaint Kerr Nonlinerities Obtained By Electromagnetically Induced Transparency"-Optics Letters vol. 21 No 23-pp. 1936-1938.

Min Yan et al-"Nonlinear Absorption By Quantum Interface in Cold Atoms"-Optics Letters vol. 26 No 8 Apr. 15, 2001- pp. 548-550.

* cited by examiner

DETECTING ONE OR MORE PHOTONS FROM THEIR INTERACTIONS WITH PROBE PHOTONS IN A MATTER SYSTEM

This patent document is a continuation-in-part and claims benefit of the earlier filing date of U.S. patent application Ser. No. 10/412,019, entitled "Photon Number Resolving Systems and Methods", filed Apr. 11, 2003, which is hereby incorporated by reference in its entirety.

BACKGROUND

Interest in quantum information processing has grown dramatically in recent years because of successes in developing quantum systems and the expected capabilities of the technology. In particular, working quantum cryptosystems have been developed, and if large (many qubit) quantum computers can be built, quantum computers will perform many processing tasks much more efficiently than can classical computers. Quantum processors having tens or hundreds of qubits, for example, would be able to perform quantum simulations unreachable with any classical machine. Such quantum processors also have the potential to extend the working distances and applicability of quantum communications.

Many candidate technologies for quantum computing hardware are currently being studied. Whichever technology turns out to be the most practical, quantum coherent communications will likely be needed for linking separate quantum computers. Coherent electromagnetic fields (as photonic qubits) seem ideal for communications between quantum computers and for general quantum communications because light, traveling either down optical fibers or through free space, can carry quantum information over large distances. Further, some quantum computing may be performed directly on photonic qubits, using non-linear or linear quantum optical processes.

Proposed quantum information systems that use photon states often require detectors capable of efficiently detecting the presence or absence of one or a few photons. One proposed optical quantum computation architecture by E. Knill, R. Laflamme, and G. Milburn, Nature 409, 46 (2001), for example, requires a high-efficiency photon detector that is more than 99.99% efficient at distinguishing quantum states including 0, 1, or 2 photons. A miscount of the number of photons or a failure to detect the presence of a photon causes an inaccurate measurement of the photon state and an error in the quantum information. Such errors, when tolerable, require error correction schemes that may be expensive to implement.

Current commercial single photon detectors generally rely to a greater or lesser extent on the photoelectric effect. With the photoelectric effect, photons incident on the surface of a metal, a semiconductor, or another material free bound electrons from atoms of the material. The excited electrons enter the surrounding space or a conduction band, where the electrons are collected as current that can be amplified and measured.

The photoelectric current from a single photon is small and difficult to detect. The best commercial photon detectors for visible light currently have a quantum efficiency of about 90% for detecting single photons, and the efficiency achieved in practice is much lower. At present, detectors for photons having wavelengths between 1.3 and 1.5 $\mu$m are only about 30% efficient. These efficiencies are too low for many quantum information systems. Additionally, the best efficiencies achieved for the visible-spectrum photon detectors require cooling the detectors down to about 6° K, and such detectors still provide relatively high "dark count" rates (e.g., high background noise when no photon is incident.)

Another drawback of most photon detectors is that the detectors absorb the photons being measured or detected. The photon detectors can thus only be used at the end of a process, when the measured photons are no longer required or when the resulting measurement controls a condition of the system.

Accordingly, quantum information systems require photon detectors that are highly efficient at detecting photons and that can accurately distinguish the number of photons in a quantum signal. Ideally, the detectors would be non-destructive, so that after the presence or number of photons has been inferred, the photon states could be used thus providing more efficient use of resources.

SUMMARY

In accordance with an embodiment of the invention, a device capable of detecting a photon signal includes a matter system, sources of a first beam and a second beam, and a measurement system. The matter system has a first energy level and a second energy level such that a photon in the signal couples to a transition between the first energy level and the second energy level. The first beam contains photons that couple to a transition between the second energy level and a third energy level of the matter system, and the second beam contains photons that couple to a transition between the third energy level and a fourth energy level of the matter system. The measurement system measures a change in one of the first beam and the second beam to detect the absence, the presence, or a number of the signal photons in the matter system.

Another embodiment of the invention is a method for detecting a number of photons in a signal state. The method includes directing the signal state and a probe state into a gate that causes a non-linear interaction between the signal state and the probe state. The probe state can be a weak coherent photon state (e.g., having an intensity parameter with a magnitude less than about 10.) To detect the absence, the presences, or the number of photons in the signal state, the method measures a change in the probe state that arises from the non-linear interaction and then infers the number of photons in the signal state from the changes in the probe state.

BRIEF DESCRIPTION OF THE DRAWINGS

Use of the same reference symbols in different figures indicates similar or identical items.

DETAILED DESCRIPTION

In accordance with an aspect of the invention, a non-destructive photon detector uses the interactions of a probe state and a signal state with a matter system to create changes in the probe state that depend on the number of photons in the signal photon state. The matter system generally includes one or more atoms, molecules, or other quantum systems having energy level transitions respectively corresponding to the energies of photons in the probe state, the signal states, and a control field. The interactions of the photons and the matter system causes electromagnetically induced transparency (EIT) that introduces phase shifts in Fock components of the probe state without destroying the signal photons. In one embodiment, the probe state is initially in a low intensity coherent state, and the matter system transforms the probe state from a coherent state to a state that is no longer a coherent state. A homodyne or heterodyne measurement system can measure the changes in the probe state for determination of the number of photons in the signal state (e.g., whether the signal state contains 0 or 1 photon).

Figure 1:
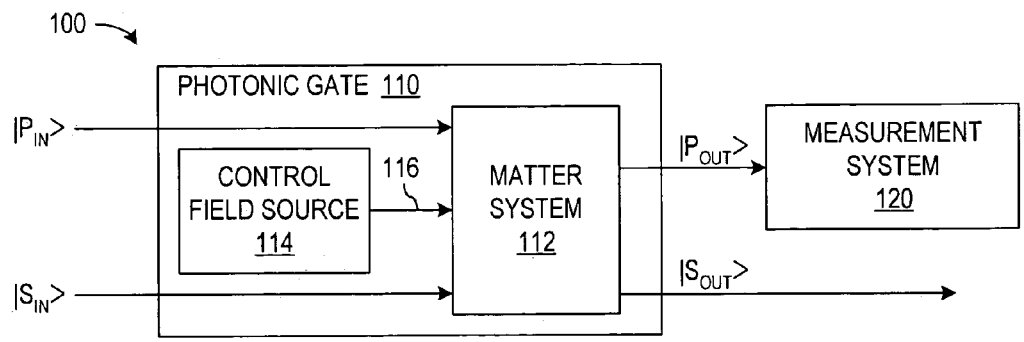
FIG. 1 is a block diagram of a number-resolving photon detector in accordance with an embodiment of the invention.

FIG. 1 illustrates a photon detector 100 in accordance with an embodiment of the invention. Photon detector 100 includes a photonic gate 110 and a measurement system 120. For a measurement, a photonic signal state $|S_{IN}\rangle$ and a photonic probe state $|P_{IN}\rangle$ are input to photonic gate 110, where the photon states interact before exiting as evolved states $|S_{OUT}\rangle$ and $|P_{OUT}\rangle$. Photonic gate 110 is preferably such that the interaction of photon states $|S_{IN}\rangle$ and $|P_{IN}\rangle$ in photonic gate 110 causes a phase shift in probe state $|P_{IN}\rangle$, and the introduced phase shift depends on the number of photons in signal state $|S_{IN}\rangle$. However, output probe state $|P_{OUT}\rangle$ may alternatively differ in intensity or some other measurable property from input probe state $|P_{IN}\rangle$. In one alternative embodiment, photonic gate 110 causes scattering of a portion of probe state $|P_{IN}\rangle$ where the scattering depends on the number of photons in signal state $|S_{IN}\rangle$.

Measurement system 120 can use homodyne or heterodyne measurement techniques to measure output probe photon state $|P_{OUT}\rangle$ and determine the change that arose in photonic gate 110. The number of photons in signal state $|S_{OUT}\rangle$ is then inferred from the measurement of probe state $|P_{OUT}\rangle$. Signal state $|S_{OUT}\rangle$, which is output from photonic gate 120, is thus in a Fock state, i.e., in a quantum state having a determined photon number. Input signal state $|S_{IN}\rangle$ could have been originally in a Fock state, in which case the input and output signal state is the same, or input signal state $|S_{IN}\rangle$ could have been in a state that is a superposition of Fock states, in which case the measurement collapses input signal state $|S_{IN}\rangle$ to output signal state $|S_{OUT}\rangle$.

The specific embodiment of photonic gate 110 illustrated in FIG. 1 uses a matter system 112 and a control field source 114 suitable for providing electromagnetically induced transparency (EIT). EIT is a well-known phenomenon in which an atom, molecule, or other condensed matter system that would normally absorb photons of a particular frequency is made transparent to the photons of that frequency through application of one or more electromagnetic fields having other frequencies. EIT generally requires a matter system having at least three quantum energy levels that are available for interactions with photons.

Figure 2A:
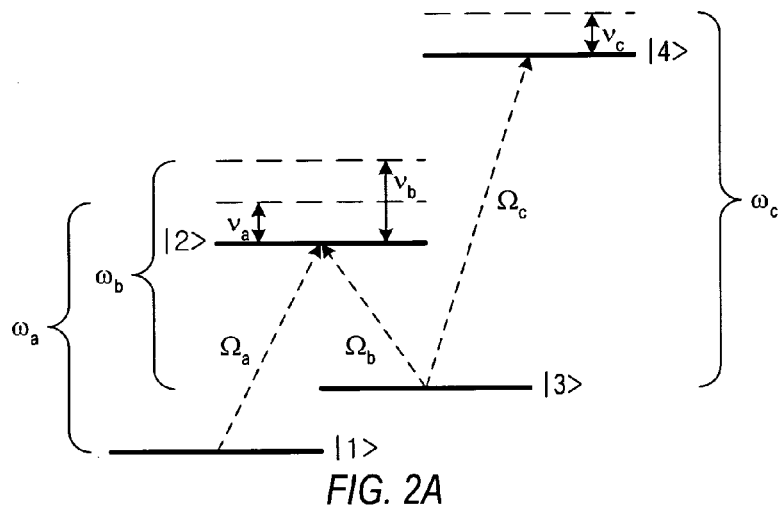
FIGS. 2A and 2B respectively illustrate semi-classical energy levels and a quantum energy manifold for a matter system suitable for use in the photon detector of FIG. 1.

In an exemplary embodiment, matter system 112 includes at least one atom, molecule, or other quantum system having four or more energy levels, and the angular frequencies $\omega_a$, $\omega_b$, and $\omega_c$ respectively of signal state $|S_{IN}\rangle$, a control field 116, and probe state $|P_{IN}\rangle$ are such that the photons couple to corresponding transitions between the quantum energy levels of matter system 112. FIG. 2A illustrates the energy levels of energy states $|1\rangle$, $|2\rangle$, $|3\rangle$, and $|4\rangle$ of a four-level matter system relative to the energies of photons having angular frequencies $\omega_a$, $\omega_b$, and $\omega_c$. With the matter system of FIG. 2A, photons of angular frequency $\omega_a$ couple atomic energy state $|1\rangle$ to energy state $|2\rangle$. Photons of angular frequency $\omega_b$ and $\omega_c$ couple the metastable energy state $|3\rangle$ to energy states $|2\rangle$ and $|4\rangle$, respectively.

The relative order of the energy levels illustrated in FIG. 2A is merely an example, and more generally, a reordering of energy levels would still permit EIT. In particular, although FIG. 2A shows the fourth energy state $|4\rangle$ as being higher in energy than the second energy state $|2\rangle$, the second state $|2\rangle$ as being higher in energy than the third energy state $|3\rangle$, and the third energy state $|3\rangle$ as being higher in energy than the first energy state $|1\rangle$, EIT can be produced in matter systems that provides other orderings of these energy levels.

Third energy state $|3\rangle$ is metastable in that no single-photon spontaneous emission is permitted. Such metastability may result, for example, if the spin/angular momentum of energy state $|3\rangle$ and available lower energy states (e.g., state $|1\rangle$) is such that a conservation law forbids emission of a single photon during a transition of the matter system from energy state $|3\rangle$ to a lower energy state. Spontaneous transitions from the fourth energy state $|4\rangle$ (e.g., to the first energy state $|1\rangle$ or the second state $|2\rangle$) is suppressed by selecting a matter system for which the fourth energy state $|4\rangle$ is metastable or by at least partially surrounding the four-level matter system with a photonic bandgap crystal that does not permit propagation of photons having angular frequencies corresponding to the transitions from the fourth energy state $|4\rangle$.

Detuning parameters $\nu_a$, $\nu_b$, and $\nu_c$ indicated the respective amount of detuning of angular frequencies $\omega_a$, $\omega_b$, and $\omega_c$ from resonances of the energy level transitions of the matter system as indicated in Equations 1. In Equations 1, the energy differences between states $|1\rangle$ and $|2\rangle$, between $|3\rangle$ and $|2\rangle$, and between $|3\rangle$ and $|4\rangle$ are $\omega_{12}$, $\omega_{32}$, and $\omega_{34}$, respectively.

$$\omega_a = (\omega_{12} + \nu_a)$$

$$\omega_b = (\omega_{32} + \nu_b)$$

$$\omega_c = (\omega_{34} + \nu_c) \qquad \text{Equations 1:}$$

Figure 2B:
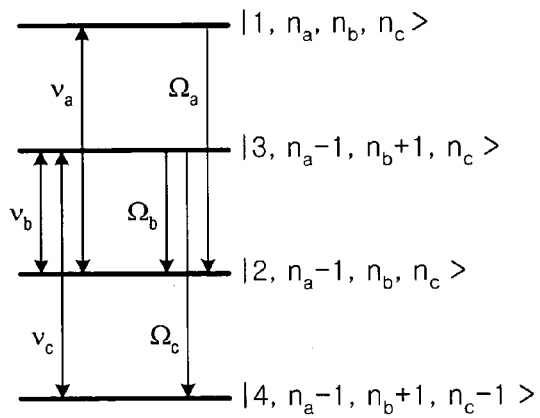

FIG. 2B shows a manifold corresponding to product states $|X, A, B, C\rangle$ of the matter system with free photons of angular frequencies $\omega_a$, $\omega_b$, and $\omega_c$. In product state $|X, A, B, C\rangle$, X indicates the energy level 1 to 4 of the matter system, and A, B, and C indicate the numbers of photons of angular frequencies $\omega_a$, $\omega_b$, and $\omega_c$, respectively. The illustrated manifold includes the states closest in energy to a matter system in energy state $|1\rangle$ with $n_a$ photons of angular frequency $\omega_a$, $n_b$ photons of angular frequency $\omega_b$, and $n_c$ photons of angular frequency $\omega_c$. The product states of the system include a series of manifolds that are similar to FIG. 2B but with different numbers of free photons. The manifold of FIG. 2B illustrates that when the detuning parameters are small, a system in state $|2, n_a-1, n_b, n_c\rangle$ can transition to state $|1, n_a, n_b, n_c\rangle$ by a spontaneous emission of a single photon, but the matter system does not permit transitions from states $|3, n_a-1, n_b+1, n_c\rangle$ and $|4, n_a-1, n_b+1, n_c-1\rangle$ to state $|1, n_a, n_b, n_c\rangle$ by spontaneous emission of a single photon.

A paper by R. Beausoleil, W. Munro, and T. Spiller entitled "Applications of Coherent Population Transfer to Information Processing," "http://xxx.lanl.gov/abs/quant-ph/0302109" and a co-owned U.S. patent application Ser. No. 10/364,987, entitled "Quantum Information Processing Using Electromagnetically Induced Transparency", which are hereby incorporated by reference in their entirety, further describe use of four-level matter systems having energy level states as illustrated in FIGS. 2A and 2B in implementations of photonic qubit gates. The incorporated references particularly describe the structure of a two-qubit phase gate suitable for use as photonic-gate 110 in FIG. 1.

The four-level matter system of FIG. 2A when pumped with photons of angular frequency $\omega_b$ mediates an interaction between photons of angular frequencies $\omega_a$ and $\omega_c$. The resulting interaction has a Hamiltonian H with an optical non-linearity that under conditions set forth in the above-cited paper of Beausoleil et al. has the form given by Equation 2A. In Equation 2A, creation operator $\hat{a}\dagger$ at and annihilation operator $\hat{a}$ respectively create and destroy a photon of angular frequency $\omega_a$, and creation operator $\hat{c}\dagger$ and annihilation operator $\hat{c}$ respectively create and destroy a photon of angular frequency $\omega_c$. Constant $\chi$ indicates the strength of the interaction and generally depends on detuning parameters $\nu_a$, $\nu_b$, and $\nu_c$, the Rabi frequencies $\Omega_a$, $\Omega_b$, and $\Omega_c$ associated with transitions, and the specific characteristics of the matter system.

$$H = \chi \hat{a}\dagger \hat{a} \hat{c}\dagger \hat{c} \qquad \text{Equation 2A:}$$

Condensed matter systems can more generally give rise to other non-linear photon interactions that are suitable for use in detectors. Equation 2B, for example, illustrates a more general representation of a term of a Hamiltonian providing a non-linear interaction between photons of angular frequencies $\psi_a$ and $\omega_c$. In Equation 2B, $f(\hat{a}\dagger, \hat{a})$ is a function of creation and annihilation operators $\hat{a}\dagger$ and $\hat{a}$, and $g(\hat{c}\dagger, \hat{c})$ is a function of creation and amnihilation operators $\hat{c}\dagger$ and $\hat{c}$. Preferably, $f(\hat{a}\dagger, \hat{a})$ is a power of photon number operator $\hat{a}\dagger\hat{a}$, e.g., $(\hat{a}\dagger\hat{a})^\lambda$ for some constant $\lambda$, so that the effect of the interaction on the state of photons of angular frequency $\omega_c$ directly depends on the number of photons of angular frequency $\omega_a$.

$$H = \chi \cdot f(\hat{a}\dagger, \hat{a}) \cdot g(\hat{c}\dagger, \hat{c}) \qquad \text{Equation 2B:}$$

Optical systems or gates that provide a general non-linear interaction between photon states in two distinct modes (e.g., spatially separated modes or distinct angular frequency modes ($\omega_a$ and $\omega_c$) may be built from a sequence of optical gates, with or without using an EIT system. In the context of quantum computing, Seth Lloyd and Samuel L. Braunstein, "Quantum Computations over Continuous Variables," Phys. Rev. Lett. 82, 1784 (1999), which is hereby incorporated by reference in its entirety, describes constructing a sequence of gates that creates an arbitrary polynomial Hamiltonian (e.g., f(a†,a) or g(c†,c)) for a single photon mode. The basic gates in the sequence for a single mode include (1) linear devices such as beam splitters and phase shifters, (2) quadratic devices such as squeezers, and (3) non-linear devices of third or higher order such as Kerr-effect fibers, atoms in optical cavities, and non-linearities generated through measurement. Such systems for two separate modes can be combined via one or more beam splitters to provide cross mode interactions and create a desired non-linear interaction f(a†,a)·g(c†,c) between the modes.

Figure 3:
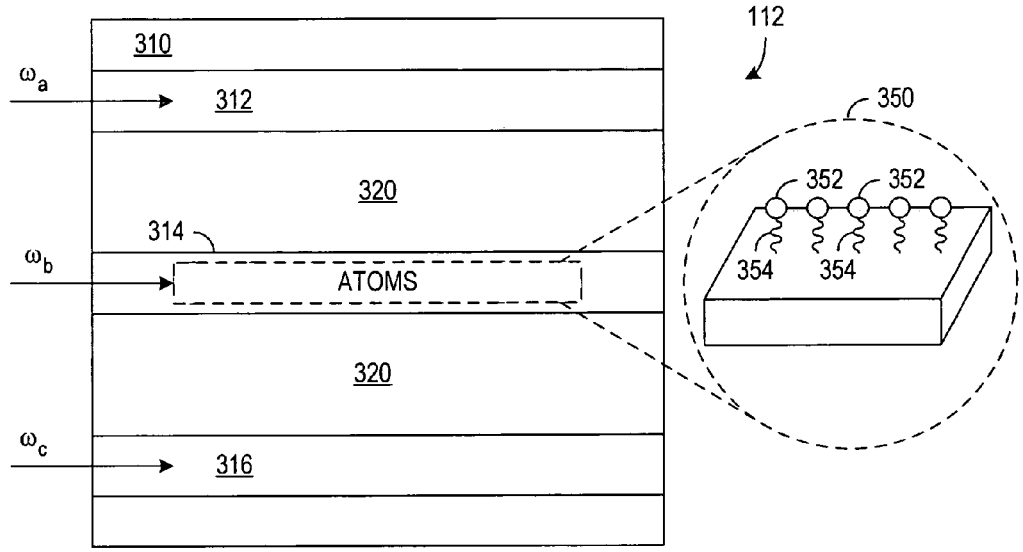
FIG. 3 illustrates an exemplary embodiment of a matter system suitable for the photon detector of FIG. 1.

In an exemplary embodiment of detector 100 described herein, matter system 112 includes one or more four-level atoms or molecules having quantum energy levels related to the photon energies as illustrated in FIG. 2A and therefore provides a crossed-Kerr non-linearity of the form given in Equation 2A. FIG. 3 illustrates an embodiment of matter system 112. In the illustrated embodiment, matter system 112 includes a substrate 310 containing waveguides 312, 314, and 316. Waveguides 312, 314, and 316 respectively receive beams having angular frequencies $\omega_a$, $\omega_b$, and $\omega_c$.

Confinement structures 354 attach a series of four-level atoms 352 to the central waveguide 314. Each confinement structure 354 can be a molecular tether or other similar structure that reduces thermal vibrations of a four-level atom 352, and in one specific embodiment, confinement structures 354 are carbon fullerenes that act to cage four-level atoms 352. Each atom 352 can be any atom that provides four accessible energy levels having the above-described relations, and atoms 352 may be, for example, atoms of a lanthanide series metal such as erbium (Er) or praseodymium (Pr), an alkali metal such as rubidium (Rb) or cesium (Cs), or an alkaline earth metal. In a typical system, a few hundred atoms 352 may be needed to achieve a desired phase shift in the probe state.

The spacing of atoms 352 relative to waveguides 312, 314, and 316 is such that atoms 352 interact with the evanescent fields surrounding waveguides 312, 314, and 316. The interaction causes EIT with a phase shift resulting in the probe photons of angular frequency $\omega_c$. Material 320 around atoms 352 can form a photonic bandgap crystal that prevents propagation of photons corresponding to spontaneous emissions from the fourth energy level of atoms 352. However, a defect or other structure between atoms 352 and waveguides 312 and 316 may be provided to permit interaction of atoms 352 with photons of angular frequency $\omega_c$.

The exemplary embodiment of detector 100 of FIG. 1 can distinguish state $|0\rangle_a$ from state $|1\rangle_a$ if signal state $|S_{IN}\rangle$ is in the Fock state $|0\rangle_a$ or $|1\rangle_a$, i.e., a state including zero or one photon of angular frequency $\omega_a$. More generally, signal state $|S_{IN}\rangle$ could contain up to n photons (where n is arbitrary), and detector 100 can efficiently determine the number n of photons. For the determination of the number of photons of angular frequency $\omega_a$ in signal state $|S_{IN}\rangle$, a laser or other control field source 114 drives control field 116 at angular frequency $\omega_b$, which corresponds to the transition between the second and third energy levels of the four-level atom. Probe state $|P_{IN}\rangle$ can be a Fock state, a coherent state, or a squeezed state containing easily measured number (e.g., 10 to $10^5$ or more) of photons of angular frequency $\omega_c$, which corresponds to the transition between the third and fourth energy levels of the four-level atom. Alternatively, the roles of angular frequencies $\omega_a$ and $\omega_c$ can be interchanged because of the symmetry of the Hamiltonian term of Equation 2A.

In one exemplary embodiment described below, probe state $|P_{IN}\rangle$ is a coherent state $|\alpha\rangle_c$. The coherent state $|\alpha\rangle_c$ is used as an example since coherent states are easily produced (or approximated) by the output from a laser. However, other types of photonic states such as squeezed states or Fock states could equally be employed as probe state $|P_{IN}\rangle$.

Equations 3 mathematically represent coherent state $|\alpha\rangle_c$ in terms of Fock states $|n\rangle_c$ having definite numbers of photons of angular frequency $\omega_c$. In Equations 3, $\alpha$ represents the state amplitude, the subscript c designates that the state contains photons of angular frequency $\omega_c$, $|n\rangle_c$ is a Fock state containing n photons of angular frequency $\omega_c$, and $n_v$ is the expectation value of the number of photon in the coherent state $|\alpha\rangle_c$.

Equation 3:

$$|\alpha\rangle_c = e^{-\frac{1}{2}|\alpha(t)|^2} \sum_{n=0}^{\infty} \frac{\alpha^n(t)}{\sqrt{n!}} |n\rangle_c$$

$$\alpha(t) = \sqrt{\langle n_V \rangle}\, e^{-i\varpi_c t}$$

When probe state $|P_{IN}\rangle$ is a coherent state $|\alpha\rangle_c$ and the signal state $|S_{IN}\rangle$ is a Fock state containing n photons, the initial state $|S_{IN}\rangle|P_{IN}\rangle$ of detector 100 is $|n\rangle_a|\alpha\rangle_c$, where subscripts a and c respectively represent photons of angular frequencies $\omega_a$ and $\omega_c$. (For this approximation, control field source 114 classically pumps four-level matter system 112 with photons of angular frequency $\omega_b$.) The effect of the crossed-Kerr non-linearity of Equation 2A now causes the photon states to evolve in time according to Equation 4.

$$|S_{OUT}\rangle|P_{OUT}\rangle = \exp\{i\chi t \hat{a}^\dagger \hat{a} \hat{c}^\dagger \hat{c}\}|n\rangle_a|\alpha\rangle_c = |n\rangle_a|\alpha e^{in\chi t}\rangle_c \quad \text{Equation 4:}$$

Equation 4 clearly shows that if no photon of angular frequency $\omega_a$ is present (n=0) in signal state $|S_{IN}\rangle$ then no phase shift occurs ($e^{in\chi t}=1$). However, if one (or more) photon of angular frequency $\omega_a$ is present in signal state $|S_{IN}\rangle$, coherent state $|\alpha\rangle_c$ evolves to $|\alpha e^{in\chi t}\rangle_c$. The size of the phase shift $e^{in\chi t}$ depends directly on the number n of photons in signal state $|S_{IN}\rangle$ as well as on coupling $\chi$ and the interaction time t of the photons with the four-level matter systems. To increase the size of the phase shift, the interaction time t can be effectively increased by increasing the number of four-level atoms or molecules that interact with states $|S_{IN}\rangle$ and $|P_{IN}\rangle$, e.g., by increasing the number of interacting four-level atoms in the optical path of the photon states $|S_{IN}\rangle$ and $|P_{IN}\rangle$. Since the coupling $\chi$ and interaction time t can be fixed and known for a particular system, a measurement of the phase shift indicates the number of photons in signal state $|S_{IN}\rangle$.

Figure 4A:
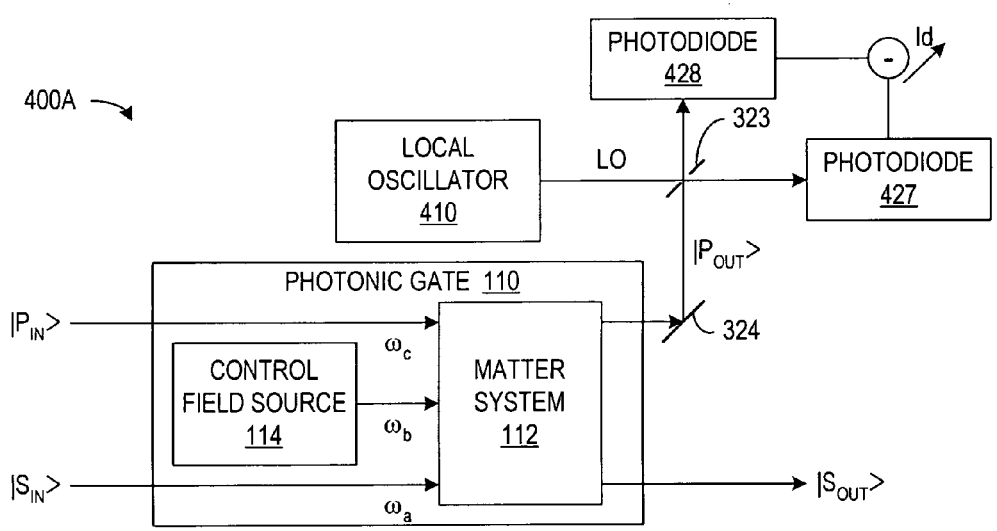
FIGS. 4A, 4B, 4C, and 4D are block diagrams of number-resolving photon detectors in accordance with embodiments of the invention using alternative homodyne or heterodyne measurement techniques to measure changes in probe photon states.

If value $\alpha$ for the coherent state is initially real, a measurement system 400A of FIG. 4A can use homodyne measurement techniques to measure the position $X=\hat{c}+\hat{c}^\dagger$ and momentum $Y=(\hat{c}-\hat{c}^\dagger)/i$ quadratures $\langle X \rangle$ and $\langle Y \rangle$ for probe state $|P_{OUT}\rangle$. The homodyne measurement in system 400A uses an oscillator or laser 410 to generate a reference beam LO that is out of phase with probe state $|P_{OUT}\rangle$ by a phase angle $\theta$. An adjustable delay element can be placed in the path of the reference beam LO to allow adjustment of phase angle $\theta$. A 50/50 beam splitter 423 at the intersection of the two beams causes subtraction of reference beam LO from probe state $|P_{OUT}\rangle$ along a path to a photodiode 427 and addition of reference beam LO to probe state $|P_{OUT}\rangle$ along a path to a photodiode 428. A difference Id in the resulting currents of photodiodes 427 and 428 is proportional to position quadrature $\langle X \rangle$ when phase angle $\theta$ is zero and is proportional to momentum quadrature $\langle Y \rangle$ when phase angle $\theta$ is $\pi/2$.

Based on Equation 4, the measured quadratures $\langle X \rangle$ and $\langle Y \rangle$ are related to the number n of photons in signal state $|S_{IN}\rangle$ (and to the constants $\alpha$, $\chi$, and t) as respectively indicated in Equations 5 and 6.

$$\langle X \rangle = 2\alpha \cos(n\chi t) \quad \text{Equation 5:}$$

$$\langle Y \rangle = 2\alpha \sin(n\chi t) \quad \text{Equation 6:}$$

If no photon of angular frequency $\omega_a$ is present (n=0), the measured position quadrature $\langle X \rangle$ is equal to twice value $\alpha$, and measured momentum quadrature $\langle Y \rangle$ is zero. If one photon of angular frequency $\omega_a$ is present (n=1), interaction time t can be controlled so that quadrature $\langle X \rangle$ is zero and quadrature $\langle Y \rangle$ is $2\alpha$. (The interaction time t can be controlled, for example, through the number of four-level atoms or molecules in matter system 112 and/or through adjustment of detuning parameters $\nu_a$, $\nu_b$, and $\nu_c$.) Thus, for an appropriately controlled reaction time t, measured quadratures $\langle X \rangle$ and $\langle Y \rangle$ provide definite and easily distinguished signatures indicating the presence or absence of a photon.

The interaction time t is not required to be such that $\sin(n\chi t)$ is unity. If the product $\chi t$ is small enough that the small angle approximation applies to Equation 6, the momentum quadrature $\langle Y \rangle$ is approximately $2\alpha\chi t$ for a single photon of angular momentum $\omega_a$ in signal state $|S_{IN}\rangle$. If parameter $\alpha$ is sufficiently large, the measurement of quadrature $\langle Y \rangle$, which is about $2\alpha\chi t$, will be much larger than signal noise, and the one-photon signal state is efficiently distinguished from the signal state containing no photons.

Figure 4B:
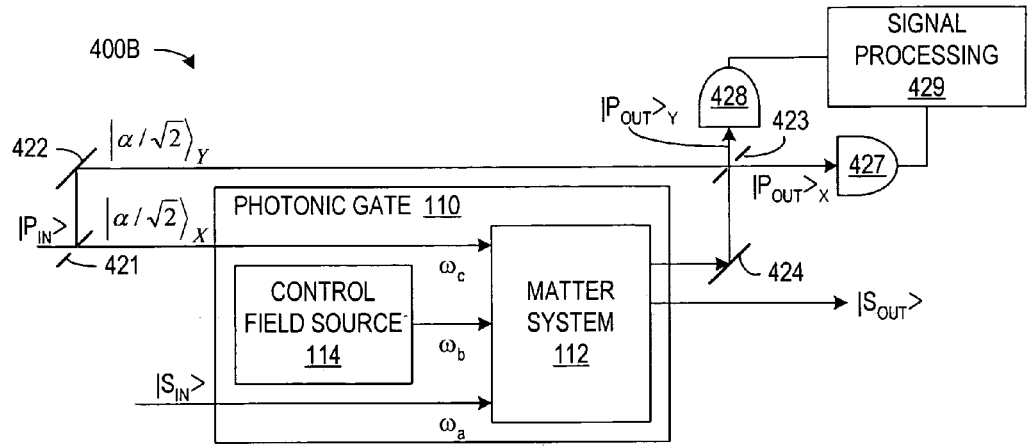

The measurement process illustrated above uses a homodyne measurement, which is highly efficient but generally requires the use of a strong local oscillator. FIG. 4B illustrates a measurement system 400B that uses a Mach-Zehnder interferometer including 50/50 beam splitters 421 and 423, reflectors 422 and 424, and photodiodes 427 and 428 to measure the phase shift in a coherent probe photon state $|\alpha\rangle$. In system 400B, 50/50 beam-splitter 421 splits the coherent state $|\alpha\rangle$ into a two-mode separable state $|\alpha/\sqrt{2}\rangle_X|\alpha/\sqrt{2}\rangle_Y$, where subscripts X and Y designate spatially separated paths. One mode $|\alpha/\sqrt{2}\rangle_X$ is input into photonic gate 110, where that mode $|\alpha/\sqrt{2}\rangle_X$ acquires a phase shift $e^{in\chi t}$ that depends on the number n of photons of angular frequency $\omega_a$ in signal state $|S_{IN}\rangle$. The phase shifted state $|\alpha e^{in\chi t}/\sqrt{2}\rangle_X$ from photonic gate 110 reflects from mirror 424 onto 50/50 beam splitter 423, which combines phase-shifted state $|\alpha e^{in\chi t}/\sqrt{2}\rangle_X$ with the second mode $|\alpha/\sqrt{2}\rangle_Y$ from beam splitter 421 via mirror 422. The output probe state after beam-splitter 423 is a two-mode state as indicated in Equation 7, where subscripts X and Y designate spatially separated paths to respective detectors 427 and 428.

$$|P_{OUT}\rangle_X|P_{OUT}\rangle_Y = |(1+e^{in\chi t})\alpha/2\rangle_X|(1-e^{in\chi t})\alpha/2\rangle_Y \quad \text{Equation 7:}$$

In the regime where $\chi t$ is small, the output probe state can be expressed as $|\alpha(1+in\chi t/2)\rangle_X|in\alpha\chi t/2\rangle_Y$, and a direct measurement of second mode $|in\alpha\chi t/2\rangle_Y$ using photodiode 428 gives a measurement current proportional to photon intensity $(n\alpha\chi t)^2$. Photodiode 428 can be a conventional device that is unable to distinguish a single photon from zero or two photons, but photodiode 428 can distinguish between zero and a large number of photons. Assuming that the product $\alpha\chi t$ is relatively large, photodiode 428 can efficiently distinguish whether output mode $|P_{OUT}\rangle_Y$ has 0 or approximately $(\alpha\chi t)^2$ photons. System 400B thus has enormous advantages over currently used detectors because the efficiency of system 400B detecting single photons is close to unity.

If signal state $|S_{IN}\rangle$ is a superposition of Fock states and of the form $c_0|0\rangle_a + c_1|1\rangle_a$, the state $|\Psi'\rangle$ of the total system after the beam splitter and EIT interaction is found to have the approximate form given in Equation 8. If photodiode 428 measures a nonzero current, then Equation 8 indicates that signal state $|S_{OUT}\rangle$ includes a photon of angular frequency $\omega_a$.

$$|\Psi'\rangle = c_0|0\rangle_a|\alpha\rangle_{bX}|0\rangle_{bY} + c_1|1\rangle_a|(1+e^{i\chi t})\alpha/2\rangle_X|(1-e^{i\chi t})\alpha/2\rangle_Y \quad \text{Equation 8:}$$

If signal state $|S_{IN}\rangle$ is a superposition of Fock states and of the form $c_0|0\rangle_a+c_1|1\rangle_a+c_2|2\rangle_a$, both component Fock states $|1\rangle_a$ and $|2\rangle_a$ include photons of angular frequency $\omega_a$ and therefore cause phase shifts. However, the magnitude of the resulting current in photodiode 428 easily distinguishes the phase shift resulting from component state $|1\rangle_a$ from the phase shift resulting from component state $|2\rangle_a$. As noted above, when $\chi_t$ is small, the current measured in photodiode 428 is approximately proportional to $(n\alpha\chi t)^2$. The current that photodiode 428 measures for component state $|2\rangle_a$ is thus about four times the current measured for component state $|1\rangle_a$.

In one operating mode of measurement system 400B, a laser can provide a continuous coherent state for probe state $|P_{IN}\rangle$, while control field source 114 continuously pumps matter system 112. With the control field and probe state being continuous, measurement system 400B does not require synchronization of probe state $|S_{IN}\rangle$ and signal state $|S_{IN}\rangle$. A conventional signal processor 429 can analyze the current signals from one or both of photodiodes 427 and 428 to monitor the number of photons in signal state $|S_{IN}\rangle$ or to determine when signal state $|S_{IN}\rangle$ is a single-photon state.

In accordance with another aspect of the invention, measurement system 400B can be tuned to act as a parity detector for signal state $|S_{IN}\rangle$. As noted above, photodiode 428 measures a probe state $|(1-e^{in\chi t})\alpha/2\rangle_Y$. If photonic gate 110 is such that the quantity $\chi t$ is equal to $\pi$, then even photon numbers produce a phase shift that is a multiple of $2\pi$, which is effectively no phase shift. Only an odd photon number n of photons in signal state $|S_{IN}\rangle$ causes a phase shift, which photodiode 428 detects as a non-zero current.

An advantage of measurement system 400B is that photodiode 428 measures light through a "dark port" that (if noise is neglected) has zero intensity unless a photon is in the signal state. The presence of a photon in the signal state thus provides a distinctive signal. However, an EIT system such as used in the exemplary embodiment of photonic gate 110 is always likely to have a limited amount of noise arising from decoherence and dephasing. Dephasing can cause a small phase shift in the probe state that would cause some light flow through the dark port of the Mach-Zehnder interferometer even when no signal photon (e.g., of angular frequency $\omega_a$) is present. However, photodiode 428 can measure the amount of light (not just the presence of light) at the dark port, and proper tuning of the phase shift induced in photonic gate 110 can make the noise insignificant compared to the amount of light from the dark port when a single signal photon is present. Photodiode 428 then distinguishes a few photons from many photons, which can be achieved using conventional photodiodes. If photonic gate 110 employs a photon loss mechanism to attenuate the probe photon state, the attenuation can similarly be maximized to distinguish the dark port signal from the noise.

The effects of noise and dissipation in detector 400B can be analyzed for the case where matter system 110 is an EIT system of FIG. 2A. If a probe state of angular frequency $\omega_c$ is used to detect photons of angular frequency $\omega_a$, one of the chief sources of error in the phase shift in the probe state is dephasing on a spontaneous 3–4 transition of matter system 110. The effect of this spontaneous emission on a coherent probe state $|\xi/\sqrt{2}\rangle$ is the introduction of a random phase shift $\phi$ resulting in an output probe state $|\xi e^{i\phi}/\sqrt{2}\rangle$. If signal state $|S_{IN}\rangle$ is the superposition $c_0|0\rangle+c_1|1\rangle$, the current $I_c$ that detector 427 measures depends on the random phase shift $\phi$ as indicated in Equation 9.

Equation 9:

$$I_c = |c_0|^2 \frac{\xi}{2}(1-\cos\phi) + |c_1|^2 \frac{\xi}{2}(1-\cos[\phi+\chi t])$$

The distribution for phase shift $\phi$ depends on the exact dephasing mechanism of matter system 110. For illustrative purposes, a square profile ranging from $-\phi_0$ to $\phi_0$ is assumed here, but a similar answer is obtained for a Gaussian or Poisson distribution. Integrating Ic over this phase distribution the current $I_c$ is of the form of Equation 10 in the limit where $\phi_0$ small. Thus the single photon can be distinguished from no photon as long as $(1 - \cos[\chi t])$ is much greater than $\phi_0^2$. Basically this requires selection of the phase shift $\chi t$ to be larger than the possible random phase $\phi_0$.

$$I_c \approx |c_0|^2 \frac{\xi^2 \phi_0^2}{12} + |c_1|^2 \frac{\xi}{2}(1-\cos[\chi t]) \qquad \text{Equation 10}$$

Figure 4C:
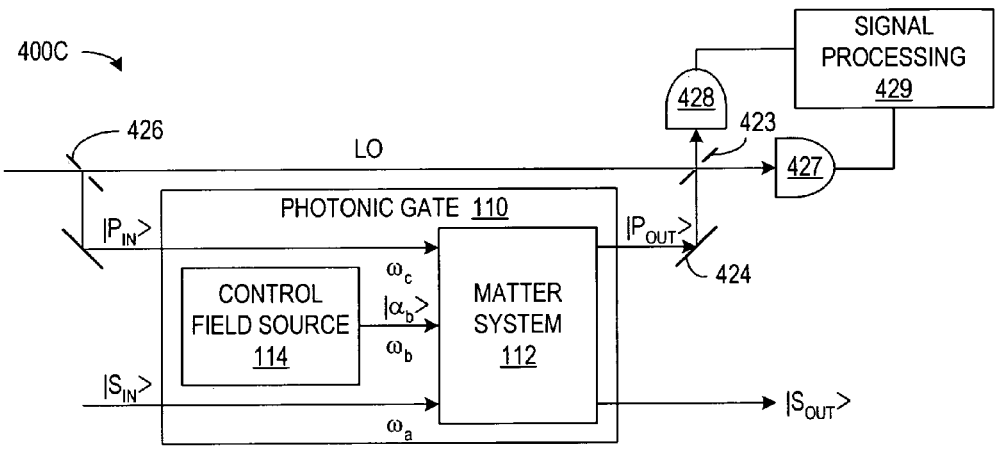

FIG. 4C illustrates a detector 400C in accordance with yet another embodiment of the invention. For detector 400C, a laser or other beam source produces a probe beam in a coherent state. A weak beam splitter 426 splits off a small fraction (e.g., 5 to 10%) of the coherent state to form input probe state $|P_{IN}\rangle$ and leave a strong local oscillator signal LO. Input probe state $|P_{IN}\rangle$ is preferably a coherent state $|\alpha_c\rangle$ having a photon number expectation value $|\alpha_c|^2$ that is less than about 100 and more preferably in a range of 10 to 50, while signal state $|S_{IN}\rangle$ is in a Fock state or superposition of Fock states having a photon number and an intensity corresponding to 0 or 1 photon.

Control field source 114 is preferably a laser producing light having an output angular frequency $\omega_b$. Accordingly, the control field is more accurately described as a coherent photon state $|\alpha_b\rangle$, rather than as a classical electromagnetic field. The properties or behavior of the coherent state $|\alpha_b\rangle$ can differ from that of a classical electromagnetic field, particularly when state $|\alpha_b\rangle$ has a photon number expectation value $|\alpha_b|^2$ that is less than about 100 (e.g., in a range of 10 to 50).

The evolution of the coherent states $|\alpha_b\rangle$ and $|\alpha_c\rangle$ can be derived from the evolution of Fock states. In particular, Fock states components containing $n_a$, $n_b$, and $n_c$ photons respectively drive the three frequency channels of the resonant four-level manifold of the quantum system. If matter system 110 includes N four-level atoms that are fixed and stationary in a volume that is small compared to the optical wavelengths, and if the durations of the three pulse envelope functions of the Fock states are long compared to the lifetime of atomic level 2, the unperturbed number eigenstate $|1, n_a, n_b, n_c\rangle$ evolves as indicated in Equation 11.

$$|1,n_a,n_b,n_c\rangle \rightarrow e^{-iWt}|1,n_a,n_b,n_c\rangle \qquad \text{Equation 11:}$$

The quantity W in Equation 11 generally depends on the properties of the matter system and the angular frequencies $\omega_a$, $\omega_b$, and $\omega_c$. Equations 12A and 12B give the quantity W in the case where angular frequencies $\omega_a$ and $\omega_b$ are precisely tuned to the respective atomic transition angular frequencies $\omega_{12}$ and $\omega_{32}$, dephasing is negligible, and the spontaneous emission branching ratios from atomic levels 2 and 4 are approximately unity. In Equation 12A, N is the number of four-level atoms, $\Omega_a$, $\Omega_b$, and $\Omega_c$ are the effective vacuum Rabi frequencies as given in Equation 12B, $\nu_c$ is the detuning parameter ($\omega_c-\omega_{43}$), and $\gamma_2$ and $\gamma_4$ are approximately equal to the spontaneous emission rates $A_{21}$ and $A_{43}$. In Equation 12B, k is an index having values a, b, and c; $\sigma_k$ by definition is the resonant atomic absorption cross-section $3\lambda_k^2/2\pi$ at wavelength $\lambda_k$ $2\pi c/\omega_c$; $\pi w_2$ is the effective laser mode cross-section area, $A_k$ is the spontaneous emission rate between two corresponding atomic levels; and $\omega_k$ is the bandwidth of the profile function describing the adiabatic interaction of a pulsed laser field with a stationary atom.

Equation 12A:

$$W = \frac{N|\Omega_a|^2|\Omega_c|^2 n_a n_c}{v_c|\Omega_b|^2 n_b + i(\gamma_4|\Omega_b|^2 n_b + \gamma_2|\Omega_c|^2 n_c)}$$

Equation 12B:

$$|\Omega_k|^2 = \frac{1}{8\pi}\frac{\sigma_k}{\pi w^2} A_k \Delta\omega_k$$

Equation 12A indicates that W for four-level EIT system is complex, indicating potential absorption of the photons of frequency $\omega_a$. However, in the parameter regime where the inequality of Equation 13 is satisfied, the probability that one of the atoms will scatter a single photon of angular frequency $\omega_a$ becomes small. (Equation 13 simplifies to the requirement that $v_c/\gamma_4$ be large when $|\Omega_b|^2|\alpha_b|^2/\gamma_2$ is about equal to $|\Omega_c|^2|\alpha_c|^2/\gamma_4$). Working in this regime, the state $|1, n_a, n_b, n_c\rangle$ acquires purely a phase-shift from the nonlinear mechanism. This phase shift can be the basis of a high-efficiency nondestructive detector.

Equation 13:

$$\frac{|\Omega_b|^2|\alpha_b|^2}{\gamma_2}\frac{v_c}{\gamma_4} \gg \frac{|\Omega_b|^2|\alpha_b|^2}{\gamma_2} + \frac{|\Omega_c|^2|\alpha_c|^2}{\gamma_4}$$

The evolution of the atom-field state including coherent states can be evaluated using sums over Fock states representing each coherent state. In particular, Equation 14 shows the evolution after a time t of an N-atom quantum state during an interaction with an $n_a$-photon Fock state in the a channel, and weak coherent states parameterized by $\alpha_b$ and $\alpha_c$ in the b and c channels, respectively. Equation 15 defines the phase shift $\phi$. Equations 14 and 15 show that evolved state $|\psi'(n_a)\rangle$ is not a simple tensor product of a Fock state with two coherent states unless the magnitude of parameter $\alpha_b$ of the original b channel coherent state is large, in which case, evolved state $|\psi'(n_a)\rangle$ is about equal to $|1,n_a,\alpha_b,\alpha_c e^{-in_a\phi}\rangle$. Therefore, only when the coupling field driving channel b is a classical field does the EIT matter system provide an exact cross-Kerr nonlinearity; and for a weak coherent state input pulse, treating this control field as a classical field is not allowed.

Equation 14:

$$|\psi(n_a)\rangle \equiv |1, n_a, \alpha_b, \alpha_c\rangle$$
$$= e^{-\frac{1}{2}(|\alpha_b|^2+|\alpha_b|^2)}\sum_{n_b=0}^{\infty}\sum_{n_c=0}^{\infty}\frac{\alpha_b^{n_b}\alpha_c^{n_c}}{\sqrt{n_b!n_c!}}|1, n_a, n_b, n_c\rangle$$

$$\rightarrow |\psi'(n_a)\rangle = e^{-\frac{1}{2}|\alpha_b|^2}\sum_{n_b=0}^{\infty}\frac{\alpha_b^{n_b}}{\sqrt{n_b!}}|1, n_a, n_b, \alpha_c e^{-i2(n_a\phi|\alpha_b|^2/n_b)}\rangle$$

-continued

Equation 15:

$$\phi \equiv \chi t \equiv \frac{N|\Omega_a|^2|\Omega_c|^2}{v_c|\Omega_b|^2|\alpha_b|^2}t$$

Even though the evolved state $|\psi'(n_a)\rangle$ may not be a coherent state, detector 400C can still efficiently determine the number $n_a$ of photons in the signal state through the measurement of quadratures $\langle X\rangle$ and/or $\langle Y\rangle$. Equation 16 defines the quadrature homodyne operator $\hat{x}(\theta)$ in terms of the creation operator $\hat{c}\dagger$ and annihilation operator $\hat{c}$ for photons of angular momentum $\omega_c$. The quadrature homodyne operator $\hat{x}(\theta)$ is equal to the position operator X for $\theta$ equal to zero and equal to momentum operator Y for $\theta$ equal to $\pi/2$. The expectation value of the quadrature homodyne operator $\hat{x}(\theta)$ can be evaluated for the evolved state of Equation 14 yielding Equations 17. Similarly, the mean square of the quadrature homodyne operator $\hat{x}(\theta)$ can be evaluated yielding Equation 18.

Equation 16:

$$\hat{x}(\theta) \equiv \frac{1}{\sqrt{2}}(\hat{c}^\dagger e^{i\theta} + \hat{c}^x e^{-i\theta})$$

Equation 17:

$$\langle \hat{x}(\theta)\rangle \equiv \langle \psi'(n_a)|\hat{x}(\theta)|\psi'(n_a)\rangle$$
$$= \sqrt{2}\, e^{-|\alpha_b|^2}\sum_{n_b=0}^{\infty}\frac{|\alpha_b|^2}{n_b}\text{Re}\left[\alpha_c e^{-i(n_a\phi|\alpha_b|^2/n_b+\theta)}\right]$$

Equation 18:

$$\langle \hat{x}^2(\theta)\rangle \equiv \langle \psi'(n_a)|\hat{x}^2(\theta)|\psi'(n_a)\rangle$$
$$= \frac{1}{2}+|\alpha_c|^2+e^{-|\alpha_b|^2}\sum_{n_b=0}^{\infty}\frac{|\alpha_b|^2}{n_b}\text{Re}\left[\alpha_c^2 e^{-i2(n_a\phi|\alpha_b|^2/n_b+\theta)}\right]$$

Based on the calculated expectation values, Equation 19 gives the signal-to-noise ratio for a photon detector measurement based on the momentum quadrature in detector 400C. In Equation 19, functional dependence (1) and (0) indicate the number $n_a$ of photons of angular frequency $\omega_a$ in the state for which the expectation value is evaluated. Since the photon states are nearly coherent, the probability of a false positive count for a state where the number $n_a$ of angular frequency $\omega_a$ is equal to 1 is given in Equation 20.

Equation 19:

$$SNR = \frac{\langle Y(1)\rangle - \langle Y(0)\rangle}{\sqrt{\langle Y^2(1)\rangle - \langle Y(1)\rangle^2}}$$

$$P_{error} \approx e^{-SNR^2} \approx e^{-(2\alpha_c \sin \theta)^2}$$

Figure 5A:
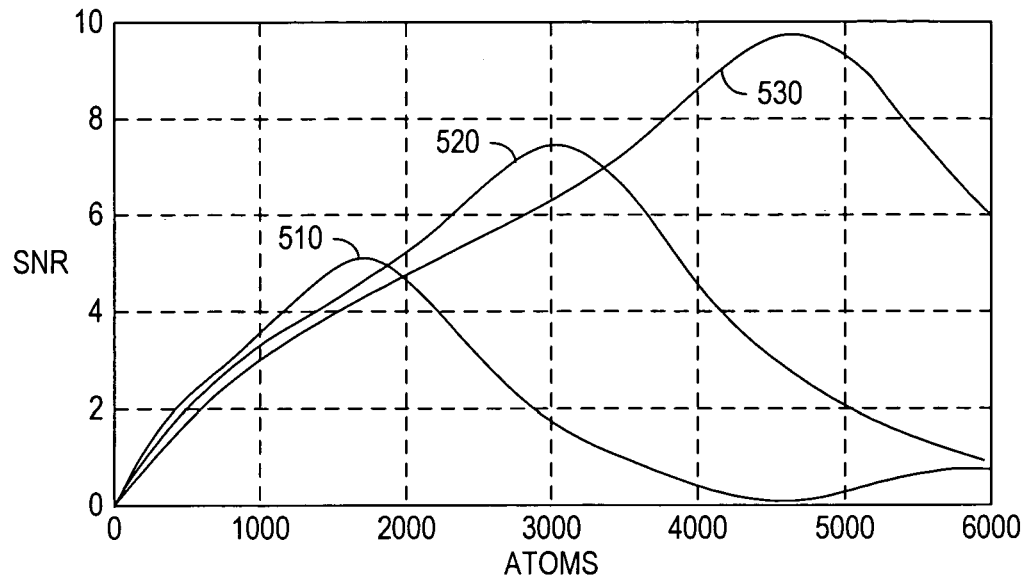
FIGS. 5A and 5B show plots of the signal-to-noise ratio for a detector using low-intensity coherent states for the applied probe state and control state.

Equation 20:

FIG. 5A shows the signal-to-noise ratio given by Equation 19 as a function of the number of atoms localized in the interaction region for $v_c/\gamma_2=30$ and three different strengths $\alpha_c$ of probe state $|P_{IN}\rangle$. Plots 510, 520, and 530 of FIG. 5A respectively correspond to parameter $\alpha_c$ equal to 4, 5, and 6 when the control field 116 and the probe state have the same strength (e.g., $|\alpha_b|=\alpha_c$).

If the wave function of Equation 14 described a coherent state, each curve in FIG. 5A would be given by $2|\alpha_b|\sin(\phi)$ and would exhibit a peak when the number N of atoms is about $15\pi^2|\alpha_b|^2$. Instead, the peaks of plots 510, 520, and 530 correspond to phase shifts smaller than $\pi/2$ because of the dependence of the summand in Equation 14 on number $n_b$. In practice, the value $|\alpha_b|^2$ should be greater than about $8\pi$ or about 25 to create a sufficiently large transparency window in the a channel for the parameters chosen here. Thus, the number of atoms needed to provide a sufficiently low probability of a false positive detection can be determined from FIG. 5A and Equation (14). In particular, with approximately 570 four-level atoms in the matter system, a phase shift of 0.24 radians corresponding to a SNR value of 2.19 is achievable. This leads to a false positive detection error probability of approximately 1 percent with a 0.8% probability of the absorption of the photon in the 1–2 transition. This specific example is not unique. A wide range of reasonable parameters leads to these error rates. Suppose for instance that one wishes to decrease the false positive detection error and absorption rates by an order of magnitude. In this case, a detuning $v_c$ of 160 (in units of the line width $\gamma_4$), 6900 atoms, and amplitudes $\alpha_b$ and $\alpha_c$ about equal to 10 achieves a phase shift of 0.137, which leads to a SNR=2.66 (or false detection probability of 0.08%) with an absorption rate of 0.08 percent. Generally to increase the SNR ratios requires one to increase the number of atoms.

Figure 5B:
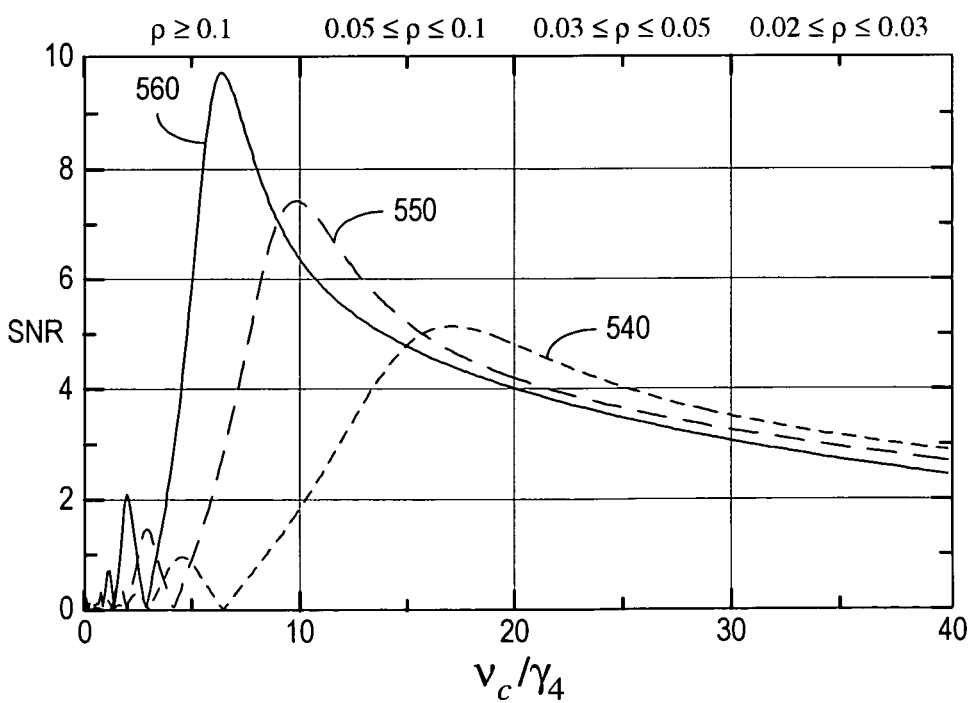

FIG. 5A also indicates that for a given value of $v_c/\gamma_4$ and $\alpha_c$ the effect of increasing the number N of atoms eventually leads to a decrease in the signal-to-noise ratio. This results from creating a phase shift that is too large. If a larger number N of atoms are going to be used, one way to avoid the decrease in signal-to-noise ratio is to decrease the ratio $v_c/\gamma_4$. FIG. 5B shows the signal-to-noise ratio given by Equation 19 as a function of ratio $v_c/\gamma_4$ for 1000 atoms localized in the interaction region. Plots 540, 550, and 560 of FIG. 5B respectively correspond to parameter $\alpha_c$ equal to 4, 5, and 6 when the control field 116 and the probe state have the same strength (e.g., $|\alpha_b|=\alpha_c$).

During a preferred operating mode of detector 400C, signal state $|S_{IN}\rangle$ corresponds to a wave packet containing zero or one photon of angular frequency $\omega_a$ and having a pulse width long enough to fit through the transparency window of EIT system. During the pulse width of the signal, control field source generates a continuous beam having a coherent state and a power or energy about 10 to 100 times that of the signal state $|S_{IN}\rangle$. Control field source 114 may include a laser with an attenuator or a beam splitter in the beam path so that the resulting control field 116 has the desired energy. Preferably, the probe state $|P_{IN}\rangle$ corresponds to a continuous beam similarly having an energy or power during the signal pulse width that is about the same as that of the control field. Beam splitter 426 that splits the beam corresponding to probe state $|P_{IN}\rangle$ from the beam corresponding to the local oscillator LO may direct less than 10% of the beam power from a laser into probe state $|P_{IN}\rangle$. With control and probe beams being continuous, the presence of a photon passing through detector 400C will result in a fluctuation in the measurement of photodiodes 427 and 428 that signal processor 429 can analyze to detect the presence of a signal photon.

Figure 4D:
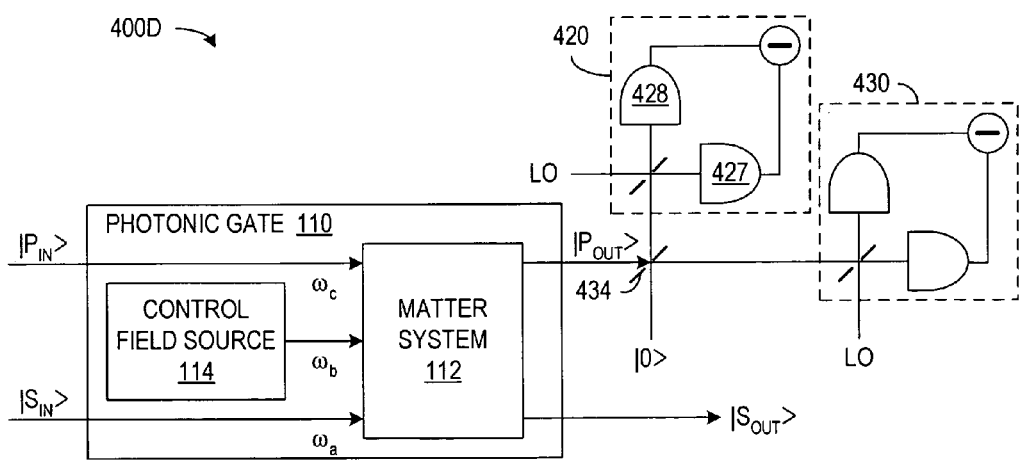

FIG. 4D shows a measurement system 400D in accordance with an embodiment of the invention using a dual homodyne (or heterodyne) measurement. In particular, measurement system 400D includes a beam splitter 434 that directs a portion of the output probe state $|P_{OUT}\rangle$ to a first homodyne detector 420 and another portion of the output probe state $|P_{OUT}\rangle$ to a second homodyne detector 430. A vacuum state $|0\rangle$ (i.e., no input) is at the other input to beam splitter 434. As a result of the phase difference that beam splitter 434 introduces between the transmitted and reflect portions of output probe state $|P_{OUT}\rangle$, homodyne detector 420 provides a measurement of the expectation value $\langle\hat{x}(\theta)\rangle$ of the homodyne operator $\hat{x}(\theta)$ for angle $\theta$, and homodyne detector 430 provides a measurement of the expectation value $\langle\hat{x}(\theta+\pi/2)\rangle$ of the homodyne operator $\hat{x}(\theta+\pi/2)$ for angle $\theta+\pi/2$. Accordingly, measurement system 400D can obtain simultaneous information about the momentum and position quadratures for the output probe state $|P_{OUT}\rangle$.

Measurement systems 400A, 400B, 400C, and 400D as described above, are able to infer the presence or absence of a photon in a signal state by measuring a probe state without directly measuring and destroying the signal photon. The photon from the signal state can thus be used after the measurement.

In accordance with another aspect of the invention, a non-destructive photon detector in accordance with an embodiment of the invention can convert a conventional, non-deterministic photon source that may sporadically or undependably emit a single photon into a deterministic photon source that releases a single photon on demand. The deterministic single photon source includes the conventional photon source, the non-destructive photon detector, and a photon storage system. The non-destructive photon detector measures the photon number for a state output from the conventional photon source. If the measured output state is not a single photon, another output photon state from the conventional photon source is measured. If the measured photon state contains a single photon, the measured photon state is stored in the photon storage system, from which the single photon state can be released on demand. When the photon detector includes a photonic gate including an EIT system, the EIT system can introduce a phase shift in a probe state and store the signal photon for later release. An array of N dependable single photon sources of this type can store N photons and release a user-selected number of (e.g., 0 to N) photons on demand.

Figure 6:
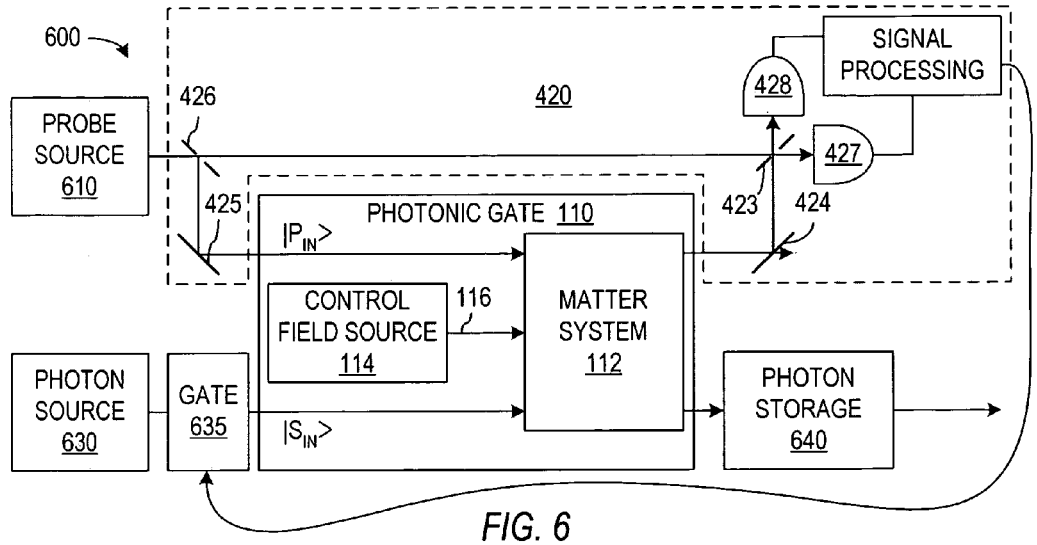
FIG. 6 is a block diagram of a single photon source in accordance with an embodiment of the invention.

FIG. 6 illustrates a deterministic single photon source 600 in accordance with a specific embodiment of the invention. Photon source 600 includes a photonic gate 110, a measurement system 620, a non-deterministic photon source 630, and a photon storage system 640.

Non-deterministic photon source 630 sometimes emits a single photon of angular frequency $\omega_a$, but most of the time emits only the vacuum. Such a source can be, for example, an electrically triggered quantum dot or highly attenuated laser. The output of photon source 630 is measured to determine whether or not source 630 emitted a photon.

For the measurement, the output state of source 630 becomes the signal state $|S_{IN}\rangle$ that is input to photonic gate 110 for measurement. A laser or other probe source 610 simultaneously generates a coherent probe state $|\alpha_c\rangle$ containing photons of angular frequency $\omega_c$ that is split so that one spatial component forms the probe state $|P_{IN}\rangle$ that is input to photonic gate 110 with signal state $|S_{IN}\rangle$. Photodiodes 427 and 428 and signal processor 429 then determine whether signal state $|S_{IN}\rangle$ includes a single photon state using the techniques described above.

If no photon is initially present in signal state $|S_{IN}\rangle$, source 630 remains active until a single photon is detected. When the measured current from photodiode 428 confirms that signal state $|S_{IN}\rangle$ includes a single photon, the photon is stored in photon storage 640, and a gate 635 shuts off further output from photon source 630. Photon storage 640 can be a device such as a fiber loop or an EIT system capable of releasing a quantum coherent photon state matching the stored photon. The stored photon can be released from photon storage 640 to deterministically provide a single photon state on demand.

In accordance with another aspect of the invention, an EIT-based arrangement used in photonic gate 110, which causes the desired phase shift in the probe state, can also store a single photon of the signal state. In particular, the duration of the probe state can be extended to effectively slow or stop propagation of the signal photon through matter system 112 until an output photon is needed. Accordingly, a separate photon storage device 640 can be eliminated if matter system 112 serves to store the signal photon.

Figure 7:
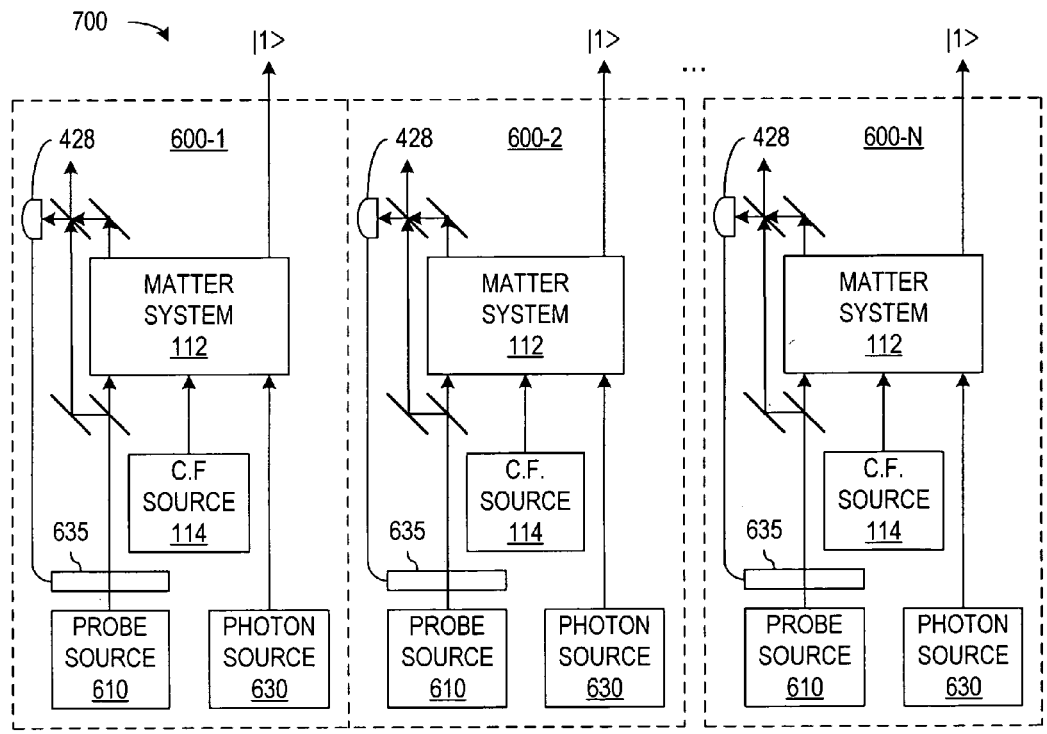
FIG. 7 is a block diagram of an N-photon source in accordance with an embodiment of the invention.

Multiple deterministic photon sources such as illustrated in FIG. 6 can be used together to produce a photon state containing a user-selected number of photons. FIG. 7 illustrates an example of an N-photon source 700 containing N single photon sources 600-1 to 600-N. Each of the single photon sources 600-1 to 600-N operates in the same manner as photon source 600 of FIG. 6 to detect and store a single photon. When photon sources 600-1 to 600-N all store single photons, any or all of the photon sources 600-1 to 600-N can be commanded to release a stored photon to produce a photon state having a user selected number of photons.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. A device comprising:
   a matter system having a first energy level and a second energy level such that a signal photon couples to a transition between the first energy level and the second energy level;
   a first source providing a first beam that contains photons that couple to a transition between the second energy level and a third energy level of the matter system, the first source directing the first beam to interact with the matter system;
   a second source providing a second beam that contains photons that couple to a transition between the third energy level and a fourth energy level of the matter system, the second source directing the second beam to interact with the matter system; and
   a measurement system arranged to measure a change in one of the first beam and the second beam to detect the signal photon in the matter system.

2. The device of claim 1, wherein the second beam has an energy that is about equal to that of the first beam.

3. The device of claim 1, wherein a ratio of an energy of the first beam and an energy of the second beam is between 0.1 and 10.

4. The device of claim 1, wherein the first beam has an energy that is less than 100 times that of a single-photon state containing the signal photon.

5. The device of claim 1, wherein the first beam has an energy that is between 10 and 50 times that of a single-photon state containing the signal photon.

6. The device of claim 1, wherein the first beam and the second beam have a continuous duration that extends beyond a pulse width of a signal photon state being measured.

7. The device of claim 1, wherein the second source comprises:
   a laser; and
   a first beam splitter positioned to split an output beam from the laser into a first spatial component that is directed into the measurement system and a second spatial component that forms the second beam.

8. The device of claim 7, wherein the measurement system comprises:
   a second beam splitter positioned to recombine the first spatial component and the second spatial component after the second spatial component interacts with the matter system; and
   a photodetector along a light path from the second beam splitter.

9. The device of claim 1, wherein the measurement system comprises a dual-homodyne measurement system.

10. The device of claim 1, wherein the second beam is initially in a coherent state, and when a signal photon is in the matter system, the second beam exits from the matter system in a state that is not a coherent state.

11. The device of claim 1, wherein the matter system causes a non-linear interaction between the signal photon state and the probe photon state.

12. The device of claim 11, where the non-linear interaction arises from electromagnetically induced transparency created in the matter system.

13. The device of claim 1, further comprising:
   a photon source that generates a signal state that has chances of including 0 or 1 photon; and
   a photon storage system that stores the photon of the signal state in response to the measurement system detecting that the signal state includes 1 photon.

14. The device of claim 1, wherein the matter system comprises a series of atoms positioned to interact with the signal photon and the first and second beams, wherein electron states in each atom correspond to the first, second, third, and fourth energy levels.

15. The device of claim 14, wherein the atoms are of an element selected from the group consisting of: erbium (Er), praseodymium (Pr), and other lanthanide series metals; rubidium (Rb), cesium (Cs) and other alkali metals; and alkaline earth metals.

16. The device of claim 1, wherein the device is a detector capable of detecting presence or absence of one signal photon in a signal state.

17. A method for detecting a number of photons in a signal state, comprising:
   directing the signal state into a gate;
   directing a probe state into the gate, wherein the probe state is a coherent photon state having an intensity parameter with a magnitude less than about 10, and the gate causes a non-linear interaction between the signal state and the probe state;
   measuring a change in the probe state that arises from the non-linear interaction; and
   inferring the number of photons in the signal state from the change in the probe state.

18. The method of claim 17, wherein the gate comprises a matter system having multiple energy levels.

19. The method of claim 18, wherein each photon in the signal state provides a coupling between a first energy level and a second energy level of the matter system.

20. The method of claim 19, wherein each photon in the probe state provides a coupling between a third energy level and a fourth energy level of the matter system.

21. The method of claim 20, further comprising applying a control field containing photons that provide a coupling between the second energy level and the third energy level of the matter system.

22. The method of claim 21, where in the control field comprises a coherent photon state having a photon number expectation value about equal to that of the probe state.

* * * * *